(12) United States Patent
Debuisschert

(10) Patent No.: US 7,639,809 B2
(45) Date of Patent: Dec. 29, 2009

(54) QUANTUM CRYPTOGRAPHY TRANSMISSION METHOD AND SYSTEM

(75) Inventor: Thierry Debuisschert, Orsay (FR)

(73) Assignee: Thales, Neuilly sur Seine (FR)

( * ) Notice: Subject to any disclaimer, the term of this patent is extended or adjusted under 35 U.S.C. 154(b) by 352 days.

(21) Appl. No.: 10/416,188

(22) PCT Filed: Nov. 9, 2001

(86) PCT No.: PCT/FR01/03503

§ 371 (c)(1),
(2), (4) Date: Oct. 8, 2003

(87) PCT Pub. No.: WO02/39663

PCT Pub. Date: May 16, 2002

(65) Prior Publication Data

US 2004/0057526 A1  Mar. 25, 2004

(30) Foreign Application Priority Data

Nov. 10, 2000  (FR)  .................... 00 14490

(51) Int. Cl.
*H04L 9/08* (2006.01)
(52) U.S. Cl. .................................. 380/256
(58) Field of Classification Search .................. 380/256
See application file for complete search history.

(56) References Cited

U.S. PATENT DOCUMENTS

| | | | | |
|---|---|---|---|---|
| 5,140,636 A * | 8/1992 | Albares | ......... | 380/54 |
| 5,307,410 A * | 4/1994 | Bennett | ......... | 380/256 |
| 5,768,378 A * | 6/1998 | Townsend et al. | ......... | 380/256 |
| 5,850,441 A * | 12/1998 | Townsend et al. | ......... | 380/283 |
| 6,188,768 B1 * | 2/2001 | Bethune et al. | ......... | 380/278 |
| 6,272,224 B1 * | 8/2001 | Mazourenko et al. | ......... | 380/283 |
| 6,522,749 B2 * | 2/2003 | Wang | ......... | 380/263 |
| 6,529,601 B1 * | 3/2003 | Townsend | ......... | 380/256 |
| 6,778,669 B1 * | 8/2004 | Lehureau | ......... | 380/256 |
| 6,801,626 B1 * | 10/2004 | Nambu | ......... | 380/256 |

FOREIGN PATENT DOCUMENTS

WO  WO-97/44936  * 11/1997

OTHER PUBLICATIONS

Bennett, Charles, "Quantum Cryptography Using Any Two Nonorthogonal States," Physical Review Letters, v. 68, N. 21, May 25, 1992, pp. 3121-3124.*
Bennett, Charles et al, "Quantum Cryptography," Scientific American, Oct. 1992, pp. 50-57.*
Brassard, Gilles, "Cryptography Column—Quantum Cryptography: A Bibliography," SIGACT News v. 24 N. 3, Oct. 1993, pp. 16-20.*

(Continued)

*Primary Examiner*—Gilberto Barron, Jr.
*Assistant Examiner*—Devin Almeida
(74) *Attorney, Agent, or Firm*—Lowe Hauptman Ham & Berner, LLP

(57) ABSTRACT

Encoding digital data intended for transmission by a particle flow of single particles, includes: encoding digital data on a parameter x of said particle flow, wherein the parameter x has a conjugated parameter y of said particle flow; and ensuring that said parameter x and said conjugated parameter y are in a minimum state ($\Delta x \cdot \Delta y = 1$).

4 Claims, 1 Drawing Sheet

OTHER PUBLICATIONS

Figure 1:
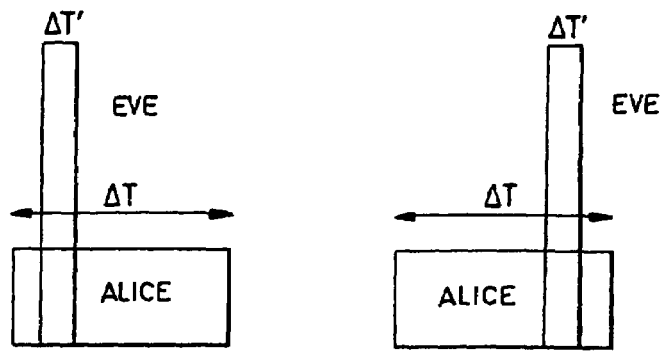

Muller, A. et al, "Experimental Demonstration of Quantum Cryptography Using Polarized Photons in Optical Fibre over More than 1 km," Europhysics Letters, v. 23, N. 6, Aug. 20, 1993, pp. 383-388.*

Shi, B.-S. et al, "Quantum key distribution using different-frequency photons," Applied Physics, B, 70, 2000, pp. 415-417.*

Zhang, Yong, "Experimental System for Quantum Cryptography Based on Two Nonorthogonal Photon Polarization States," Chinese Physics Letters, v. 15, N. 4, 1998 (received Nov. 6, 1997), pp. 238-239.*

Zhang, Yong-Sheng et al, "Quantum key distribution via quantum encryption," Physical Review A, v. 64, N. 024302, Jun. 28, 2001 (received Nov. 9, 2000), pp. 1-4.*

Voudas A. et al; "Pulse Position Modulation And Extended Pulse Position Modulation With Squeezed Light"; Journal of Modern Optics, London, GB, vol. 41, No. 12; Dec. 1, 1994; pp. 2291-2299, XP002053123.

* cited by examiner

QUANTUM CRYPTOGRAPHY TRANSMISSION METHOD AND SYSTEM

The invention concerns the field of cryptography.

Through the use of cryptography, a message can only be read by its recipient. A key is used to encrypt the message. The owner of the key is the only person who can read the message received.

The encryption key must therefore be transmitted by the sender to the recipient of the encrypted message. Transmission is carried out such that only the recipient of the encrypted message receives this encryption key. Interception by a third party of the encryption key is detected by the sender or the recipient. Consequently, the encryption key detected as intercepted is not used for the message encryption.

The principle of transmitting encryption keys is used, for example, in quantum cryptography. It consists of using physical properties to guarantee the integrity of a received encryption key.

The encryption key consists of a bit sequence. The encryption key is encoded on a flow of particles. The particles may be, for example, photons or may be other types of particles. In the case where the particles are photons, a time shift of a pulse on a light flow is associated with each bit. The light flow, encoded in the time domain and comprising a flow of photons, is then attenuated. The probability of detecting two photons associated with the same bit is then negligible.

The transmitter (Alice) can encode the encryption key on two nonorthogonal states. The pulses sent by Alice have a time width of $\Delta T$ and amplitude such that the probability of detecting a photon throughout the pulse duration is equal to one (state with one photon) or sufficiently low so that the probability of detecting two photons is negligible faced with the probability of detecting one (coherent state).

In reception, the detection states are chosen in a base with two states. These two detection states are orthogonal respectively to each state of the base used by the sender. During transmission, the transmission and detection states are chosen independently of each other.

If the states chosen by the transmitter and the receiver are orthogonal, the detection probability is zero. The measurement result is certain, there is no ambiguity. If they are not orthogonal, there are two possible measurement results since the probability of detecting the photon is 0.5. If the photon is detected, it is certain that the transmitter state is at 45° to the receiver state. There is no ambiguity. Irrespective of the configuration, there is always a possibility of not detecting the photon. This non detection of the photon makes deducing the choice of transmitter shift, using the receiver state, ambiguous. This ambiguity concerning the shift is used in quantum cryptography.

Detection of the photon is a point process which can occur at any time during the pulse. The spy (Eve) can, for example, measure all the pulses sent by Alice. She has a detector of quantum efficiency equal to one. For each pulse transmitted by Alice, she detects the corresponding photon. If she can instantaneously retransmit to the receiver Bob pulse with one photon but time width of $\Delta T'$ shorter than that sent by Alice, she can also read the information without being unmasked as shown in FIG. 1.

Bob then in fact receives shorter pulses but he cannot detect this. The probability of detecting a photon is the same as when the pulses would not have been intercepted. In addition, their time position is consistent with the encoding imposed by Alice. Half of the pulses retransmitted by Eve result in exploitable information (unambiguous) and the other half in ambiguous results. When Alice and Bob compare the key portions, they will be unable to detect an increase in the error rate which would indicate the presence of a spy.

Consequently, if the pulse duration is not fixed, a third party, the spy (Eve), can measure the information transmitted by the transmitter (Alice) and return an equivalent signal to the receiver (Bob) without being detected. Eve then has a copy of the information, without being unmasked. This type of spying is difficult to carry out in practice but the possibility of this principle cannot be excluded.

This invention proposes a means of preventing this type of spying by using a minimum state. This minimum state is one where the product of the uncertainty of the encoding parameter and its conjugated parameter is equal to its minimum value.

This invention concerns a method to encode digital data on one of the parameters x of a particle flow intended for transmission such that the probability of transmitting two particles per period is negligible, wherein the parameter x and its conjugated parameter are in a minimum state ($\Delta x . \Delta y = 1$).

The invention proposes a method of decoding digital data encoded such that two conjugated parameters x and y in the encoded particle flow are in a minimum state, the probability of detecting two particles per period being negligible, wherein it comprises at least:

a filtering step used to separate the particles received satisfying the relation $\Delta x_1 . \Delta y_1 \geqq 1$ but where $\Delta x_1 \neq \Delta x$ or $\Delta y_1 \neq \Delta y$ ($\Delta x$ and $\Delta y$ fixed) from the particles characterized $\Delta x$ and $\Delta y$, and a decoding step as such to decode particles satisfying the minimum state relation.

The decoding method is implemented by a decoder of digital data encoded such that two conjugated parameters x and y in the encoded particle flow are in a minimum state, the probability of detecting two particles per period being negligible, wherein the decoder comprises at least:

a filter used to separate the particles received satisfying the relation $\Delta x_1 . \Delta y_1 \geqq 1$ but where $\Delta x_1 \neq \Delta x$ or $\Delta y_1 \neq \Delta y$ ($\Delta x$ and $\Delta y$ fixed) from the particles characterized $\Delta x$ and $\Delta y$, and an elementary decoder receiving only those particles satisfying the minimum state relation.

The advantages and features of the invention will be clearer on reading the following description, given as an example, illustrated by the attached figures representing in:

FIG. 1, the representation of the pulses transmitted by Alice and Eve according to the state of the art technology.

Figure 2:
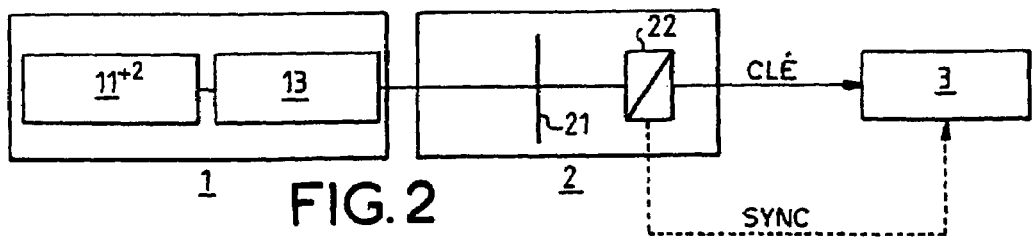
Figures 3A, 3B:
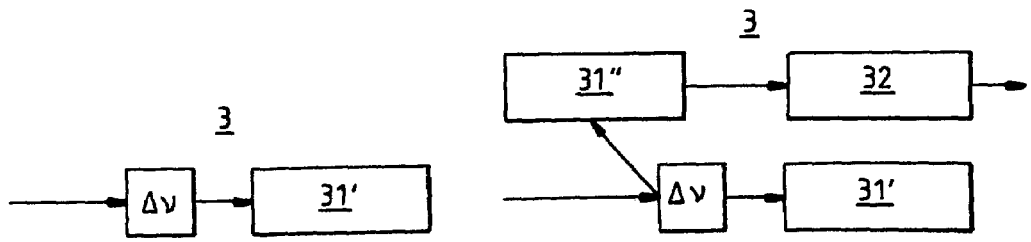
Figure 4:
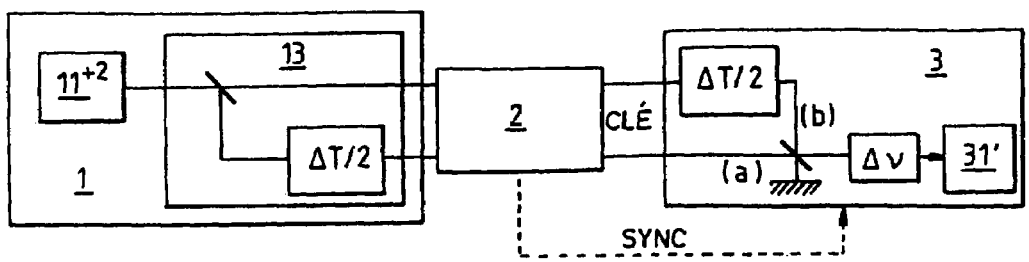

FIG. 2, a block diagram of the transmission system implementing the invention,

FIG. 3(a), a first variant of the decoder according to the invention,

FIG. 3(b), a second variant of the decoder according to the invention,

FIG. 4, a transmission system with a "interferometer" structure according to the invention.

The parameters satisfying the minimum state chosen as an example in the figures and the description are the time width $\Delta T$ of the pulse carrying the information and its conjugate: the spectral width $\Delta v$ of this pulse. The principles and system can be applied for all types of encoding parameter x (time width, spectral width, polarization, position, pulse, beam size, beam divergence, etc.) and its parameter y such that they satisfy the minimum state relation $\Delta x . \Delta y = 1$.

On FIG. 1, the pulses of time width $\Delta T$ are transmitted by Alice. If Eve detects a photon, she can retransmit a pulse of shorter time width $\Delta T'$ so that Bob cannot detect the interception. The amplitudes of the pulses transmitted by Alice and Eve are such that the probability of detecting a photon is the same for both pulse types. Depending on the instant of detection, the pulse transmitted by Eve carries, or not, the information.

To prevent the type of spying described above and shown on FIG. 1, the pulses are also defined in the frequency space. The pulses transmitted by Alice are characterized by a time width $\Delta T$ and a spectral width $\Delta v$ whose product is always greater than a constant of approximate value one: $\Delta T'.\Delta v \geq 1$. This relation is similar to the Heisenberg uncertainty relations which connect two conjugated parameters x and y: $\Delta x'.\Delta y \geq h$. When this relation becomes an equality, we obtain a minimum state. The uncertainty on one of the conjugated variables is directly the inverse of the uncertainty on the other conjugated variable. These variables may be, for example, the position $p_z$ and the pulse z. The equivalent in the time-frequency space is called the "Fourier Transform" pulse. It satisfies the relation $\Delta T'.\Delta v = 1$.

FIG. 2, shows the block diagram of a transmission system implementing the invention. Encoder 1 supplies, therefore, a flow of pulses in a minimum state carrying the information to be transmitted on the value of the pulse shift with respect to the initial instant of the period.

This type of encoder may include:

[ENCODER A] Either an encoded pulse source $11^{+2}$ (for example, a laser generating a discontinuous laser beam of pulses more or less shifted according to the encoded data and satisfying the minimum state relation),

[ENCODER B] Or a controllable delay gate 13 receiving a particle pulse flow satisfying the minimum state relation and from a pulse source $11^{+2}$,

[ENCODER C (case illustrated in FIG. 2)] Or an encoded pulse chopper (not shown) chopping pulses satisfying the minimum state relation with the appropriate time shift depending on the data to be encoded at a frequency Tb in a continuous beam from a laser,

[ENCODER D] Or an encoded pulse chopper chopping pulses satisfying the minimum state relation at frequency Tb in a continuous beam from a pulse particle source $11^{+2}$ then a controllable delay gate 13 shifting the pulses more or less with respect to the initial instant of the period depending on the data to be encoded.

In the example shown in FIG. 2, the encoder 1 includes a pulse particle source $11^{+2}$ (mode-locked laser, for example) and a delay gate 13 such that the encoded pulses satisfy the minimum state relation. The encoded particle flow supplied by the encoder 1 is then attenuated by the attenuator 2 before being transmitted on a channel. This channel is known as a quantum channel since the probability that two particles are transmitted on the channel per period is negligible or the probability that a single particle is transmitted on the channel per period is equal to 1. The attenuator 2 proposed by FIG. 2 includes a half-wave plate 21 followed by a polarizer 22 supplying a "key" beam CLE on the quantum channel. In addition, the polarizer can supply a second, more intense beam. This secondary "sync" beam can be used as a reference to synchronize the transmitter and receiver clocks of the quantum cryptography transmission system. The receiver includes at least one decoder 3 receiving the "key" beam CLE. This decoder 3 is, possibly, synchronized with the transmitter using the secondary "sync" beam.

If the time width $\Delta T$ and the spectral width $\Delta v$ of the pulses transmitted satisfy the minimum state relation $\Delta v.\Delta T=1$, a first variant of the decoder 3 proposed by FIG. 3(a) can be used. The photons of the "key" quantum signal CLE received are filtered by a filter of spectral width $\Delta v$. The photons of spectral width $\Delta v$ are observed by the photon counter 31' activated on the observation windows on which the value of the transmitted bit is certain (one window for the bits of value "0" and one window for the bits of value "1").

On FIG. 3b, the photons reflected by the filter $\Delta v$ are also counted by a photon counter 31". The comparator 32 checks whether the number $N_{\Delta f}$ of reflected photons is greater to much greater than the number $N_{\Delta v}$ of photons observed in a first and a second observation window. If this is the case, the decoder 3 decides that the data transmitted has been intercepted by a third party. Otherwise, depending on whether the photon counter 31' detects a photon in one or other of the observation windows, the decoder 3 decides whether a bit of value "0" or "1" has been transmitted. Lastly, if the photon counter 31' does not detect any photons in either observation window, the decoder 3 decides that there is non-reception. It cannot determine whether this non-reception is due to poor quality transmission or to interception by a third party.

Pulses close to the minimum state relation can be produced, for example, by mode-locked lasers $11^{+2}$ in an encoder 1. The time shifts are produced outside the laser with a delay gate 13. The use of pulses produced by mode-locked lasers $11^{+2}$ has significant practical consequences.

Typically in fact, the pulse durations are between 10 ps and 100 fs. These values are much less than the response times of the existing photon counters (31') (typically 1 ns). It is then impossible to distinguish between a pulse shifted and a pulse not shifted. This function can be carried out by an electrically controlled gate (not shown) located in front of the photon counter (31'). The possibility of producing this type of gate largely depends on the response times obtained with the technology used, for example: 10 GHz with an electro-optical modulator.

The pulses satisfying the minimum state relation in the time-frequency space protect against this type of spying described by FIG. 1. In fact, Eve intercepts the pulses sent by Alice and retransmits pulses of time width T' and spectral width $\Delta v'$ which must also satisfy the relation $\Delta T'.\Delta v'=1$ so that the probability of detecting a photon remains the same. If the time width T' is much smaller than T, then the spectral width $\Delta v'$ is necessarily larger than $\Delta v$. To detect whether the durations of the pulses transmitted by Eve have been modified, a filter of width $\Delta v$ is simply placed in front of Bob's photon counter as shown on FIG. 3(b). Most photons transmitted by Eve will then be reflected. By placing, for example, a second photon counter on the path of the reflected beam, the counting rate on this counter will suddenly increase when Eve transmits pulses shorter than those expected by Bob. The filter can be produced, for example, with an interference filter or a Fabry-Pérot filter with adjustable spacing to choose the spectral passband.

If the pulses used are too short with respect to the gate switching time, an interferometer can be used between the transmitter and the receiver as shown on FIG. 4. A pulse particle source $11^{+2}$ generates the particle flow as a train of pulses of time width $\Delta T$ and frequency Tb. In this case, the delay gate 13 includes the separating element of the interferometer. The particle flow is therefore split into two parts sent on the two arms of the interferometer. In one arm, the delay gate 13 may, for example, transmit or not the pulse in a delay line of duration $\Delta T/2$ (if t0=0, t1=T/2) depending on the data to be encoded. The particle flows are attenuated on the two arms by the attenuator 2 before being transmitted as "key" signal. The attenuator may, for example, use the secondary flow as "sync" synchronization signal to synchronize the transmitter with the receiver. The decoder 3 then transmits or not the pulse of the other interferometer arm into a delay line of identical duration ($\Delta T/2$ for example). If the delay gate 13 and the decoder 3 have chosen the same delay 0 or $\Delta T/2$, then the probability of detecting a photon is 100% in one of the output channels (channel a) and zero in the other channel (channel b). If the delay gate 13 and the decoder 3 have chosen different delays, then the probability of detecting a photon is 50% in each channel. The fact that the counter 31' detects a particle in channel b is used to determine with 100% probability the delay which was chosen by the delay gate 13. The particle counter 31' is placed downstream from a filter for the particles of spectral width $\Delta v$ or may, for example, be replaced by the device shown on FIG. 3(b) if the pulses generated have minimum state.

The encoding/decoding systems and methods using the minimum state relation for quantum cryptography have been described above for particles with time encoding. The conjugated parameter is then the spectral width of the pulse carrying the information to be transmitted. It is therefore possible to separate by simple filtering on the conjugated parameter the transmitted particles which do not satisfy the minimum state relation.

The use of time width and spectral width parameters is only an example of realization. Generally, all types of parameter x (time width, spectral width, polarization, position; pulse, beam size, beam divergence, etc.) can be used to carry the information to be transmitted. The invention is then based on the fact that this parameter x and its conjugated parameter y (respectively: spectral width, time width, conjugated parameter of the polarization, pulse, position, beam divergence, beam size, etc.) satisfy the minimum state relation $\Delta x'\Delta y=1$ on transmission. On reception, it is then easy to separate the particles satisfying the minimum state relation by filtering according to the conjugated parameter y. The filtering can be used to separate the particles received satisfying the relation $\Delta x_1.\Delta y_1 \geq 1$ but where $\Delta x_1 \neq \Delta x$ or $\Delta y_1 \neq \Delta y$ ($\Delta x$ and $\Delta y$ fixed by the encoder and known a prior by the decoder) from the particles characterized $\Delta x$ and $\Delta y$.

The invention claimed is:

1. A method to encode digital data intended for transmission by a particle flow of single particles, comprising the steps of:
    encoding digital data on a duration $\Delta T$ of said particle flow, and the duration $\Delta T$ has a conjugated parameter $\Delta v$ that is a spectral width of said particle flow; and ensuring that said duration $\Delta T$ and said conjugated parameter $\Delta v$ are in a minimum state ($\Delta T.\Delta v=1$), wherein
    the encoding method comprises the conversion of the sequence of K bits of digital data into a train of K pulses of particle flows of duration $\Delta T$ and spectral width $\Delta v$ satisfying the minimum state relation $\Delta T.\Delta v=1$, whose frequency Tb, is predetermined knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that $0 \leq k < K$ and the shifts t0 and t1 are such that $0 \leq t0,t1 \leq Tb-\Delta T$ and $0 < t1-t01 < \Delta T$.

2. A digital data encoder for encoding data on a particle flow of single particles intended for a particle transmitter, the digital data encoder is configured to encode said digital data on a duration $\Delta T$ of said particle flow, the duration $\Delta T$ has a conjugated parameter that is the spectral width $\Delta v$ of said particle flow, and the digital data encoder comprises a device configured to control the duration $\Delta T$ to ensure that the duration $\Delta T$ and the conjugated parameter $\Delta v$ are in a minimum state ($\Delta T.\Delta v=1$), wherein:
    the encoder can be used to convert the sequence of K bits of digital data into a train of K pulses of duration $\Delta T$, and spectral width $\Delta v$, satisfying the minimum state relation $\Delta T.\Delta v=1$, whose frequency Tb, is predetermined knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that $0 \leq k < K$ and the shifts t0 and t1 are such that $0 \leq t0,t1 \leq Tb-\Delta T$ and $0 < t1-t01 < \Delta T$.

3. A method of decoding encoded digital data encoded on a single particle flow having two conjugated parameters that are a duration $\Delta T$ and a spectral width $\Delta v$ in a minimum state, the method comprising:
    a filtering step used to separate the particles received having duration $\Delta T_1$ and spectral width $\Delta v_1$, and satisfying the relation $\Delta T_1.\Delta v_1 \geq 1$ but where $\Delta T_1 \neq \Delta T$ or $\Delta v_1 \neq \Delta v$ ($\Delta T$ and $\Delta v$ fixed) from particles having duration $\Delta T$ and spectral width $\Delta v$, and
    a decoding step as such to decode particles satisfying the minimum state relation ($\Delta T.\Delta v=1$), wherein:
    the time width $\Delta T$ of the pulse is shifted or not depending on the value of the bits to be encoded and the spectral width $\Delta v$ thereof, where $\Delta t=\Delta T-1t1-t01$, the decoding then comprising:
        the filtering step which is used to separate the particles of spectral width $\Delta v$ from the other particles, and
        the decoding step which comprises:
            observation of the flow of particles received on or two time windows for each bit reception period of duration Tb,
    if $t0<t1$, the first time observation window starts at instant t0 (inclusive) and ends at instant t1 (exclusive), the second observation window starts at instant $t1+\Delta t$ (exclusive) and ends at instant $t1+T$ (inclusive),
    if $t1<t0$, the first time observation window starts at instant t1 (inclusive) and ends at instant t0 (exclusive), the second observation window starts at instant $t0+\Delta t$ (exclusive) and ends at instant $t0+T$ (inclusive),
    detection of particles in the time observation window(s) generates:
        a bit of value "0":
            if $t0<t1$, when a particle is detected in the window starting at t0 of period k,
            if $t1<t0$, when a particle is detected in the window starting at $t0+\Delta t$ of period k,
        a bit of value "1":
            if $t1<t0$, when a particle is detected in the window starting at t1 of period k,
            if $t0<t1$, when a particle is detected in the window starting at $t1+\Delta t$ of period k,
        a signal indicating an ambiguity on the bit value if no particle was detected in the first and the second observation window,
        and/or the count of the number $N_{\Delta v}$ of particles received of spectral width equal to $\Delta v$, the count of the number $N_{\Delta f}$ of particles received of different spectral widths $\Delta f$ ($\Delta f \neq \Delta v$) and a comparison of these two numbers $N_{\Delta v}$ and $N_{\Delta f}$ such that if $N_{\Delta v} << N_{\Delta f}$, the interception of particles by a third party is indicated;

4. A decoder of encoded digital data, encoded on an encoded single particle flow having two conjugated parameters that are a duration $\Delta T$ and a spectral width $\Delta v$ in a minimum state, wherein the decoder comprises:
    a filter used to separate the particles received having duration $\Delta T_1$ and spectral width $\Delta v_1$, and satisfying the relation $\Delta T_1 . \Delta v_1 \geqq 1$ but where $\Delta T_1 \neq \Delta T$ or $\Delta v_1 \neq \Delta v$ ($\Delta T$ and $\Delta v$ fixed) from the particles having duration $\Delta T$ and spectral width $\Delta v$, and an elementary decoder receiving only those particles satisfying the minimum state relation ($\Delta T . \Delta v = 1$), wherein:

the time width $\Delta T$ of the pulse is shifted or not depending on the value of the bits to be encoded and the spectral width $\Delta v$ thereof, where $\Delta t = \Delta T - 1 t 1 - t 0 1$, the decoder then comprising:

the filter for the particles of the pulses of spectral width $\Delta v$, at least one first particle counter:
  which is activated on one or two time observation windows of the bit reception period of duration Tb:
    if $t0 < t1$, the first time observation window starts at instant t0 (inclusive) and ends at instant t1 (exclusive), the second observation window starts at instant $t1 + \Delta t$ (exclusive) and ends at instant $t1 + T$ (inclusive);
    if $t1 < t0$, the first time observation window starts at instant t1 (inclusive) and ends at instant t0 (exclusive), the second observation window starts at instant $t0 + \Delta t$ (exclusive) and ends at instant $t0 + T$ (inclusive);
  which is used to detect the presence or not of particles in the time observation window(s) and generate:
    a bit of value "0":
    if $t0 < t1$, when a particle is detected in the window starting at t0 of period k,
    if $t1 < t0$, when a particle is detected in the window starting at $t0 + \Delta t$ of period k,
    a bit of value "1":
    if $t1 < t0$, when a particle is detected in the window starting at t1 of period k,
    if $t0 < t1$, when a particle is detected in the window starting at $t1 + \Delta t$ of period k,
      a signal indicating an ambiguity on the bit value if no particle was detected in the first in the second observation window, and/or the first particle counter generating the number of particles $N_{\Delta v}$ which the particle counter detects and the decoder comprises, in addition, at least:

a second counter generating the number of particles $N_{\Delta f}$ received by the decoder and of spectral widths $\Delta f$ different from $\Delta f \neq \Delta v$, and a comparator of these two numbers $N_{\Delta v}$ and $N_{\Delta f}$ such that if $N_{\Delta v} << N_{\Delta f}$, the comparator generates a predetermined signal indicating either the ambiguity on the bit value or interception of particles by a third party.

* * * * *